(No Model.) 2 Sheets—Sheet 1.
H. H. WAIT.
VARIPOLAR MOTOR OR DYNAMO.
No. 599,815. Patented Mar. 1, 1898.
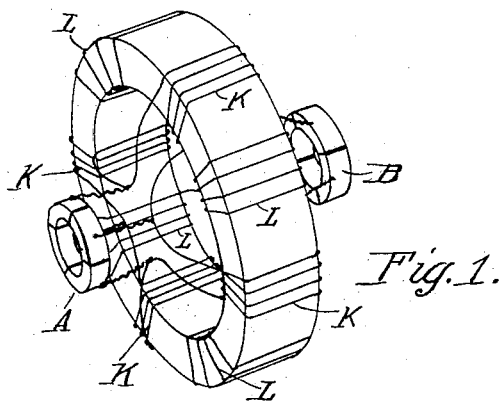
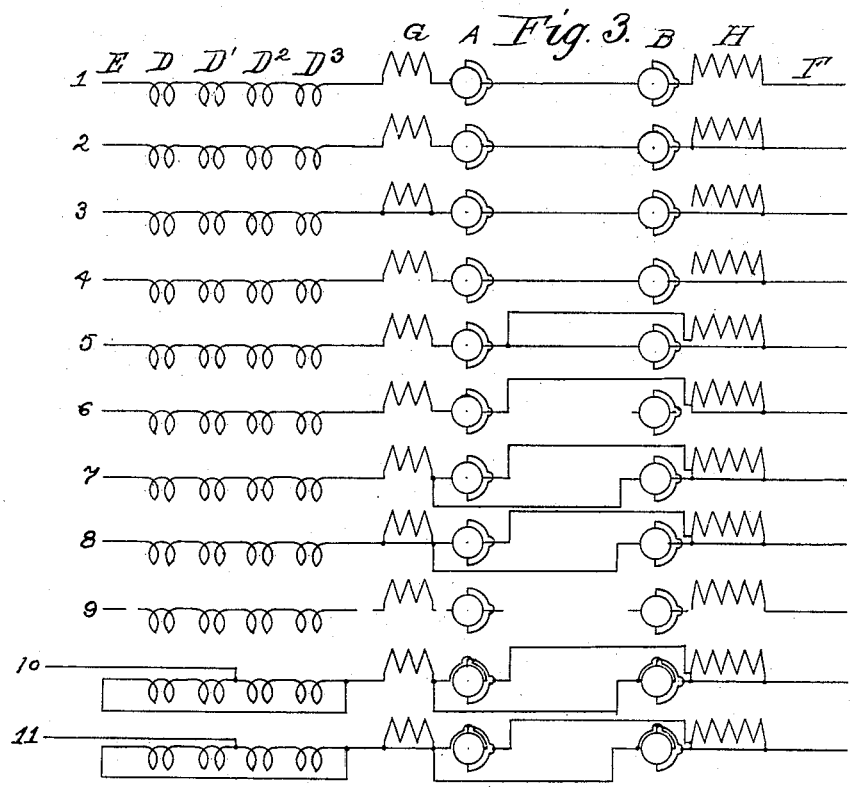
Witnesses:
D. H. C. Tanner
George L. Cragg
Inventor:
Henry H. Wait,
By Barton & Brown,
Attorneys.

(No Model.)
H. H. WAIT.
VARIPOLAR MOTOR OR DYNAMO.
No. 599,815.
Patented Mar. 1, 1898.
2 Sheets—Sheet 2.
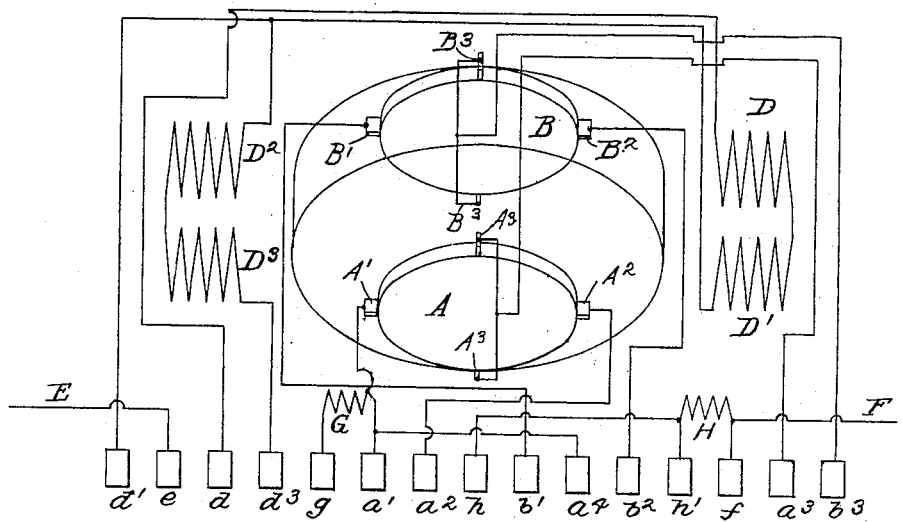
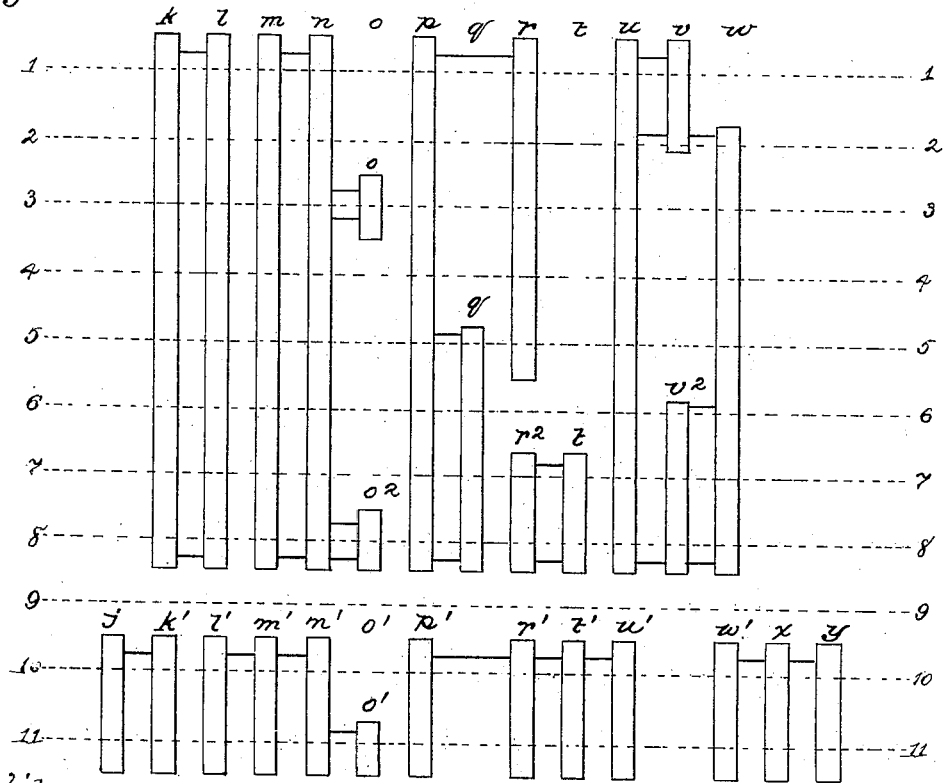
Fig. 2.
Witnesses:
D. W. C. Tanner.
George L. Cragg
Inventor:
Henry H. Wait,
By Barton & Brown
Attorneys.

UNITED STATES PATENT OFFICE.

HENRY H. WAIT, OF CHICAGO, ILLINOIS, ASSIGNOR TO THE WESTERN ELECTRIC COMPANY, OF SAME PLACE.

VARIPOLAR MOTOR OR DYNAMO.

SPECIFICATION forming part of Letters Patent No. 599,815, dated March 1, 1898.

Application filed August 20, 1896. Renewed July 29, 1897. Serial No. 646,415. (No model.)

*To all whom it may concern:*

Be it known that I, HENRY H. WAIT, a citizen of the United States, residing at Chicago, in the county of Cook and State of Illinois, have invented a certain new and useful Improvement in Varipolar Motors or Dynamos, (Case No. 7,) of which the following is a full, clear, concise, and exact description, reference being had to the accompanying drawings, forming a part of this specification.

My invention relates to an improvement in varipolar dynamo-electric machinery which is applicable more particularly to motors of that type, the object of my invention being to provide in a single motor a wider range of speed than it is possible to obtain with a simple varipolar or series-parallel system.

The improvement contemplated by my invention consists in providing in a varipolar motor a double set of armature-windings connected with separate commutators which are in connection with a switch adapted to connect the said windings either in series or parallel to vary the range of speed of the motor, while by a continued movement of the switch the effective poles of the fields may be varied in number to produce the same result.

I will describe my invention more particularly by reference to the accompanying drawings, in which—

Figure 1 is a diagrammatic view showing the armature provided with two separate windings and commutators. Fig. 2 is a diagrammatic view of the motor connections and the controller-cylinder developed upon a plane. Fig. 3 diagrammatically illustrates the motor-circuits in the various running positions of the controller-cylinder.

Like letters refer to like parts throughout the several figures.

The commutators A and B, mounted upon opposite ends of the armature-shaft of the motor, are connected, respectively, with the two separate armature-windings K L. Brushes A' A² and the pair A³ are provided for the commutator A, and brushes B' B² and the pair B³ engage the commutator B. The field-coils are represented by D, D', D², and D³, and the terminals of the operating-circuit by E F.

At G and H are resistances which may be introduced into the motor-circuits.

The circuits through the motor are controlled by a rotatable cylinder carrying upon its periphery contact-strips of varying lengths represented below the diagram of the motor connections developed upon a plane. Immediately above the respective conducting-strips are shown fingers or contacts which engage the said strips. The connections of these contacts are as follows: Contacts $e$ and $f$ are connected, respectively, with the current-supply mains E and F. Contact $d$ is connected with the field-coil D, contact $d'$ with the field-coils D' and D², contact $d^3$ with the field-coil D³, contact $g$ with the resistance G, contacts $a'$ $a^4$ with the brush A', contacts $a^2$ $a^3$, respectively, with the brushes A² A³, contacts $h$ $h'$ with the resistance H, and contacts $b'$ $b^2$ $b^3$, respectively, with brushes B' B² B³.

By rotating the controlling-cylinder eleven operative positions thereof are obtained, the said contacts engaging conducting-strips upon the cylinder along the various horizontal lines indicated upon the diagram of the cylinder, the number of each position being given at the sides of the said diagram. The conducting-strips are electrically connected, as indicated in Fig. 2, the connections being: strips $k$ and $l$, strips $m$, $n$, $o$, and $o^2$, strips $p$, $q$, and $r$, strips $r^2$ and $t$, strips $u$, $v$, $v^2$, and $w$, strips $j$ and $k'$, strips $l'$, $m'$, $n'$, and $o'$, strips $p'$, $r'$, $t'$, and $u'$, and strips $w'$, $x$, and $y$. By means of these various operative positions of the controlling-cylinder the following principal groupings of the armatures and fields are obtained:

(*a.*) Two bipolar armatures in series with the fields, also in series. This grouping gives a full-load speed $s$ and requires a full-load current $c$.

(*b.*) Two bipolar armatures in parallel and in series with the fields, also in series, which results, approximately, in a full-load speed of $2s$ and consumes a current of $2c$.

(*c.*) Two four-pole armatures in parallel connected in series with the field-coils grouped in parallel, by which grouping the full-load speed is increased, approximately, to $4s$ and the current required is represented by $4c$.

When the controlling-cylinder is rotated so that the contacts bear upon their respective conducting-strips in the first operative position, the slowest speed of the motor is obtained. Current then flows as indicated in diagram 1, Fig. 3, which may be traced as follows: main E, contact $e$, strips $k$ and $l$, contact $d$, through the field-coils in series, contact $d^3$, strips $m$ and $n$, contact $g$, resistance G, brush A' of the commutator A, through the armature-winding K to brush $A^2$, contact $a^2$, strips $p$ and $r$, contact $b'$, brush B' of the commutator B, armature-winding L, brush $B^2$, contact $b^2$, strips $u$ and $v$, contact $h'$, through the resistance H to the main F. In positions 2 and 3 the motor-circuits are identical with those in position 1, except the resistances H and G are successively cut out of circuit by the strips $w$ and $o$. It will be noticed that position 3 therefore corresponds to $(a)$ of the classification of motor-circuits above given, and a material increase of torque can thereby be obtained in starting the motor without making extra demands upon the source of power, for the motor as thus connected requires but a small current $c$ and any increase above that is accompanied by a corresponding increase in the torque. The motor now runs as a bipolar motor, the pole-piece D being of the same polarity as pole-piece $D^2$ and pole-piece D' of the same polarity as pole-piece $D^3$, thus producing two consequent poles. Upon the further rotation of the cylinder through positions 4, 5, and 6, which are merely intermediate positions, and the cylinder is constructed so that it will not stop thereon, the circuit through the armature and field coils is altered from series to a parallel grouping of the armature-coils with the fields in series, the circuit in the intermediate positions being readily traced.

The connections in position 7 may be traced from the main E to contact $e$, strips $k$ and $l$, contact $d$, through the field-coils in series, contact $d^3$, strips $m$ $n$, contact $g$, resistance G, at which point the current divides to flow through the armature-windings grouped in parallel, one portion passing to brush A', through the armature-winding K to brush $A^2$, contact $a^2$, strips $p$ $q$, contacts $h$ and $h'$, strips $v^2$ $w$, contact $f$, to the main F. The other path taken by the current from resistance G may be traced to contact $a^4$, strips $t$ $r^2$, contact $b'$, brush B', through the other armature-winding L to brush $B^2$, contact $b^2$, strips $u$ $v^2$ $w$, contact $f$, to the main F. By this circuit arrangement we have two bipolar armatures in parallel with the fields which are in series with one resistance. Position 8, corresponding to $(b)$ of the classification, is identical with position 7, except that the resistance G is cut out of circuit by the strip $o^2$, which engages the contact $a'$.

Continued rotation of the controlling-cylinder serves to momentarily open the motor-circuits, which are almost immediately closed in position 10, with the current reversed through the fields D' D, connected in parallel with the fields $D^2$ $D^3$, which gives a four-pole field, as the pole-pieces D' D are thereby changed in polarity. It is accordingly necessary in order to secure the best results in the operation of the motor that the pole-pieces be distributed at approximately equal distances from one another about the armature. The armature in this position is likewise connected to run as a four-pole armature, and with these exceptions the circuits are identical with those in position 7. Position 11 differs from position 10 only in the respect that resistance G is cut out of circuit. This, it will be seen, corresponds to $(c)$ of the classification, wherein the full-load speed of $4^s$ is attained.

By employing a motor of this construction in connection with the controlling-switch the torque can be enormously increased at starting without making a demand upon the source of power for more than the full-load current, as the full-load torque may be obtained when the motor is driven at its slowest speed by a current of approximately one-fourth that normally required at full load and full speed. This is accomplished without injury to the motor, as the current may be increased considerably during the comparatively brief interval of starting without danger, whereby the extra torque is obtained without the waste of current in overcoming the resistance used in starting a motor of the usual type, and at the same time the supply-mains are not taxed to furnish more than the normal current, thereby endangering the safety devices protecting the line. The motor herewith shown also offers the advantages of material reductions in size and weight over dynamo-electric machinery hitherto designed to accomplish like results where the range of speed is very great.

In connection with my present application I desire to refer to a copending application by myself for United States Letters Patent, Serial No. 591,501, filed May 14, 1896, for improvements in varipolar dynamo-electric machines, wherein I have broadly claimed a portion of the subject-matter herein shown and described.

I have illustrated my invention in connection with a motor employing the series type of field-windings; but the arrangement herein described is equally applicable to a shunt-wound machine which would be particularly adapted to the purpose of driving various appliances requiring different constant speeds. It is evident also that the machine herewith shown could be driven as a dynamo to supply current of various voltages.

I accordingly do not wish to be understood as limiting my invention to the type of motor herein shown and described, the manner of changing the armature connections from series to parallel, nor the arrangement for accomplishing the increase or decrease in the number of effective poles of the machine.

Having described my invention, what I claim as new, and desire to secure by Letters Patent, is—

1. The herein-described method of operating a motor at different speeds, which consists in supplying current to the motor, producing thereby a magnetic field having a definite number of effective poles, subjecting the currents traversing the armature to the influence of the field thus produced, whereby the armature is caused to rotate at a different rate of speed, changing the paths of the currents traversing the armature-windings from series to parallel and subjecting the currents thus traversing the armature to the influence of the magnetic field as before, whereby the rate of rotation of the armature is increased, then increasing the number of effective poles of the field and redirecting the armature-currents in new paths in accordance with the changed condition of the field, whereby the armature is caused to rotate at a higher rate of speed, substantially as described.

2. In a dynamo-electric machine, the combination with varipolar fields, of a plurality of independent armature-windings, and separate commutators for the said independent windings, substantially as described.

3. In a dynamo-electric machine, the combination with a field-magnet system in which the number of effective poles may be varied by reversing the flow of current through a portion of the said fields, of independent windings provided upon the armature, and separate commutators provided for each of the said windings, substantially as described.

4. The combination with a varipolar dynamo-electric machine, of independent windings provided upon the armature thereof, separate commutators provided for the said independent armature-windings, and a controlling-switch adapted to effect consecutive changes in the field and armature circuits, substantially as and for the purpose specified.

5. In an electric motor provided with a varipolar field system, the combination with independent armature-windings, of separate commutators and brushes therefor, and a controlling-switch adapted to connect the said fields and armature-windings in various combinations of series and parallel connections in conjunction with changes of the effective poles of the motor to obtain different rates of speed, substantially as described.

6. The combination with an electric motor provided with a field-magnet system $D\ D'\ D^2\ D^3$ of varipolar type, of a Gramme-ring armature with two independent windings thereon, commutators A and B connected respectively with the said independent windings, brushes $A'\ A^2$ and the pair $A^3$, and brushes $B'\ B^2$ and the pair $B^3$, engaging respectively the said commutators A and B, current-supply mains E F connected with a source of electrical current, contacts controlling the various motor-circuits, and a switch adapted to control the speed of the motor by varying the motor connections from series to parallel and increasing the number of effective poles of the field through variations in the electrical connections of the said contacts, substantially as described.

In witness whereof I hereunto subscribe my name this 12th day of May, A. D. 1896.

HENRY H. WAIT.

Witnesses:
A. L. LAWRENCE,
M. L. SWARTWOUT.